(12) United States Patent
Yang et al.

(10) Patent No.: US 10,445,590 B2
(45) Date of Patent: Oct. 15, 2019

(54) IMAGE PROCESSING APPARATUS AND METHOD AND MONITORING SYSTEM

(71) Applicant: CANON KABUSHIKI KAISHA, Tokyo (JP)

(72) Inventors: Qin Yang, Beijing (CN); Xuyu Zhao, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 15/597,040

(22) Filed: May 16, 2017

(65) Prior Publication Data

US 2017/0337431 A1 Nov. 23, 2017

(30) Foreign Application Priority Data

May 18, 2016 (CN) .......................... 2016 1 0329688

(51) Int. Cl.
*G06K 9/00* (2006.01)
*G06K 9/46* (2006.01)
*G06K 9/62* (2006.01)
*H04N 7/18* (2006.01)

(52) U.S. Cl.
CPC ....... *G06K 9/00771* (2013.01); *G06K 9/4642* (2013.01); *G06K 9/4661* (2013.01); *G06K 9/6212* (2013.01); *H04N 7/18* (2013.01); *H04N 7/181* (2013.01); *H04N 7/183* (2013.01)

(58) Field of Classification Search
CPC ............. G06K 9/00771; G06K 9/4661; G06K 9/6212; H04N 7/18; H04N 7/181; H04N 7/183
See application file for complete search history.

(56) References Cited

U.S. PATENT DOCUMENTS

| | | | | |
|---|---|---|---|---|
| 5,243,418 A | * | 9/1993 | Kuno ............... | G08B 13/19602 348/155 |
| 5,278,914 A | * | 1/1994 | Kinoshita ................ | H04N 7/18 348/94 |
| 5,748,775 A | * | 5/1998 | Tsuchikawa ....... | G06K 9/00369 375/E7.083 |
| 5,777,690 A | * | 7/1998 | Takeda .................... | G01S 11/12 348/155 |

(Continued)

*Primary Examiner* — Peter D Le
(74) *Attorney, Agent, or Firm* — Canon U.S.A., Inc. IP Division

(57) ABSTRACT

One of the aspects of the present invention discloses an image processing apparatus. The apparatus comprises: a unit configured to acquire a current image and a background image; a unit configured to detect a foreground object from the current image according to the background image; a unit configured to determine a first parameter according to luminance information of the foreground object in the current image and luminance information of portion corresponding to the foreground object in the background image, wherein the first parameter represents change degree of luminance direction of the portion corresponding to the foreground object from the background image to the foreground image; and a unit configured to identify whether the foreground object is a false foreground object or not according to the first parameter. According to the present invention, the accuracy of identifying the false foreground objects will be improved.

7 Claims, 10 Drawing Sheets

(56) References Cited

U.S. PATENT DOCUMENTS

| | | | | | |
|---|---|---|---|---|---|
| 6,008,865 | A | * | 12/1999 | Fogel | H04N 19/577 |
| | | | | | 348/169 |
| 6,061,088 | A | * | 5/2000 | Khosravi | G06K 9/00771 |
| | | | | | 348/169 |
| 6,335,985 | B1 | * | 1/2002 | Sambonsugi | G06K 9/3241 |
| | | | | | 382/190 |
| 2001/0002936 | A1 | * | 6/2001 | Tsuji | G06K 9/6203 |
| | | | | | 382/170 |
| 2001/0004400 | A1 | * | 6/2001 | Aoki | G08B 13/19602 |
| | | | | | 382/107 |
| 2010/0103193 | A1 | * | 4/2010 | Abe | H04N 5/775 |
| | | | | | 345/620 |
| 2012/0206593 | A1 | * | 8/2012 | Shimodaira | G01N 21/8851 |
| | | | | | 348/125 |
| 2014/0003720 | A1 | * | 1/2014 | Seow | G06K 9/00771 |
| | | | | | 382/173 |

\* cited by examiner

IMAGE PROCESSING APPARATUS AND METHOD AND MONITORING SYSTEM

CROSS-REFERENCE TO RELATED APPLICATIONS

This application claims the benefit of Chinese Patent Application No. 201610329688.7 filed on May 18, 2016, which is hereby incorporated by reference herein in its entirety.

BACKGROUND OF THE INVENTION

Field of the Invention

The present invention relates to image processing, and particularly relates to, for example, foreground object identification and monitoring.

Description of the Related Art

In image processing, a video refers to a sequence of images, and the images are also referred to as frames. And generally, an image is made up of visual elements, that is to say, the visual elements are visible characteristics contributing to the appearance of an image; wherein one visual element for example could be a pixel, a Discrete Cosine Transform (DCT) block which represents a group of pixels or a super-pixel which represents a group of pixels with the similar attributes (e.g. similar texture, similar color, similar luminance).

During video surveillance, in order to track moving objects or new appeared objects from frame-to-frame, firstly, it is need to detect foreground objects in current frame with reference to the background (i.e. the background image or the background model image) of a video. Wherein, the moving objects and the new appeared objects are the so-called foreground objects in the current frame (i.e. the current image or the foreground image) of the video, and the background is adaptively obtained based on the frames of the video in a certain duration time previous to the current frame. The existing background subtraction techniques are the conventional and effective approaches to detect the foreground objects. However, in actual applications, environmental illumination changes will negatively affect the video surveillance's ability to accurately detect the foreground objects. Wherein, the environmental illumination changes may include, for example, shadows and highlights caused by illumination fluctuations due to lack of ambient light, shadows due to artificial light sources at night, or shadows cast by real objects. Generally, the shadows and highlights caused by the environmental illumination changes will be wrongly detected as the foreground objects (i.e. false foreground objects), since these shadows and highlights differ in appearance from the background.

Therefore, it's necessary that there is a technology which could identify whether the detected foreground objects are the false foreground objects or not. Patent application US2014/0003720 has disclosed a method for removing the false foreground pixels which are caused by environmental illumination changes via analyzing the reflectance of the foreground image. The reflectance is determined based on the foreground image and the background image via the Retinex theory, wherein the background image is used as a proxy for an environmental illuminance component of the foreground image. And the pixels in the foreground image will be determined as the false foreground pixels and will be removed from the foreground image in case the reflectance is less than the predefined threshold value.

However, the accurate reflectance of the foreground image is difficult to be determined via the Retinex theory, therefore, an approximated value which is estimated by using the existed mathematics technology (such as the low frequency filter method) is always used as the reflectance of the foreground image.

SUMMARY OF THE INVENTION

Therefore, in view of the above recitations in Description of the Related Art, the present disclosure aims to solve the problems as described above.

According to one aspect of the present invention, there is provided an image processing apparatus, comprising: an acquirement unit configured to acquire a current image and a background image, wherein the background image is obtained according to images acquired in a predefined duration time previous to the current image; a foreground object detection unit configured to detect a foreground object from the current image according to the background image; a parameter determination unit configured to determine a first parameter according to luminance information of the foreground object in the current image and luminance information of portion corresponding to the foreground object in the background image; wherein the first parameter represents change degree of luminance direction of the portion corresponding to the foreground object from the background image to the current image; and a foreground object identification unit configured to identify whether the foreground object is a false foreground object or not according to the first parameter. Wherein, the foreground object identification unit will identify the foreground object as the false foreground object in case that the first parameter is larger than or equal to a first predefined threshold.

Taking advantage of the present invention, the accuracy of identifying the false foreground objects will be improved.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1A:
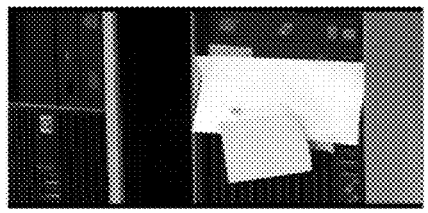
FIGS. 1A to 1B schematically show an exemplary background image and an exemplary foreground image.

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

Please note that similar reference numerals and letters refer to similar items in the figures, and thus once an item is defined in one figure, it need not be discussed for following figures.

As described above, the above-mentioned patent application US2014/0003720 uses an approximated value as the reflectance of the foreground image to identify whether the foreground pixels are the false foreground pixels or not, which will affect the identification accuracy. Thus, in case there are certain accuracy parameters which could be obtained from the current image and the background image directly, the identification accuracy would be improved by using these accuracy parameters. Wherein, the current image is the image from which the foreground objects would be detected. The background image is the image which is adaptively obtained based on images acquired in a certain duration time previous to the current image, and the certain duration time is not limited and is set based on experimental statistics and/or experience. In one instance, the background image is an average image of a plurality of images acquired in the certain duration time previous to the current image. In another instance, the background image is any one of the images acquired in the certain duration time previous to the current image. In the other instance, the background image is obtained timely according to models which are generated for each pixel based on Gaussian Models.

Through the analysis, the inventors found that there are two parameters which could be obtained from the current image and the background image directly. And these two parameters could be determined according to luminance information (such as luminance values and variance of the luminance values) of the foreground object in the current image and luminance information of portion corresponding to the foreground object in the background image. The first parameter is a parameter which represents change degree of luminance direction of the portion corresponding to the foreground object from the background image to the current image, and this first parameter is called as a luminance change ratio in the present invention for example. Wherein, the change of the luminance direction comprises becoming brightness or becoming darkness for example. The second parameter is a parameter which represents uniformity of surface pattern (e.g. texture uniformity, color uniformity) between the foreground object in the current image and the portion corresponding to the foreground object in the background image, and this second parameter is called as a luminance variance difference in the present invention for example.

Furthermore, the inventors also find that there are certain natural regularities in these two parameters. In one aspect, distribution of the change of the luminance direction of the portion corresponding to the foreground object from the background image to the current image is generally discrete (such as some of the visual elements become brightness and some of the visual elements become darkness) in case the foreground object is caused by a real object (such as a person who enters a room). And distribution of the change of the luminance direction of the portion corresponding to the foreground object from the background image to the current image is generally uniform (such as all of the visual elements become brightness or become darkness) in case the foreground object is caused by the light sources (such as turning on the light sources or turning off the light sources). Therefore, the luminance change ratio is generally small in case the foreground object is a real object, and the luminance change ratio is generally large in case the foreground object is caused by the light sources. In another aspect, the surface pattern between the portion corresponding to the foreground object in the background image and the current image is uniform in case the foreground object is caused by the light sources (e.g. the foreground object caused by the light sources' on/off). That is to say, the luminance variance difference is generally small in case the foreground object is caused by the light sources.

Therefore, in one aspect of the present invention, the luminance change ratio is used to identify the false foreground objects directly. More specifically, as for one foreground object detected from the current image, the foreground object will be regarded as a false foreground object in case its luminance change ratio is larger than or equal to a predefined threshold (such as the first predefined threshold, TH1), wherein the false foreground objects are caused by the light sources' on/off for example, and the TH1 is predefined based on experimental statistics, machine learning and/or experience.

Figure 1B:
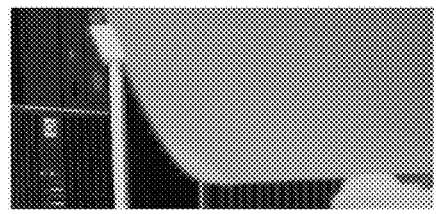

In some situations, although the luminance change ratio is larger than or equal to TH1, the corresponding foreground object is a real object actually. For example, as shown in FIG. 1A and FIG. 1B, wherein FIG. 1A shows an exemplary background image and FIG. 1B shows an exemplary foreground image, the change of the luminance direction of the portion corresponding to the foreground object from the background image to the current image is caused by a real object, wherein the real object occupies a large area of the current image and has the uniform color. In this situation, the luminance change ratio also will be larger than or equal to TH1.

Therefore, in order to exclude the wrong identification, in another aspect of the present invention, the luminance change ratio and the luminance variance difference are used to identify the false foreground objects. In one implementation, the luminance change ratio is used to exclude some real foreground objects first. More specifically, as for one foreground object detected from the current image, the foreground object will be regarded as a real foreground object in case its luminance change ratio is less than TH1. And then, the luminance variance difference is used to identify the false foreground objects from the remained foreground objects which are not regarded as the real foreground objects via the luminance change ratio. More specifically, as for one remained foreground object, the foreground object will be identified as a false foreground object in case its luminance variance difference is less than a predefined threshold (such as a second predefined threshold, TH2), wherein the TH2 is predefined based on experimental statistics, machine learning and/or experience. Otherwise, the foreground object will be regarded as a real foreground object.

As described above, the present invention will identify one foreground object as a false foreground object in case that the corresponding luminance change ratio is larger than or equal to TH1 or in case that the corresponding luminance change ratio is larger than or equal to TH1 and the corresponding luminance variance difference is less than TH2. Since the luminance change ratio and the luminance variance difference (i.e. the first parameter and the second parameter) are obtained from the current image and the background image directly, and these two parameters have the actual values instead of the approximated values, the identification accuracy of the present invention would be improved by using these accuracy parameters.

(Hardware Configuration)

Figure 2:
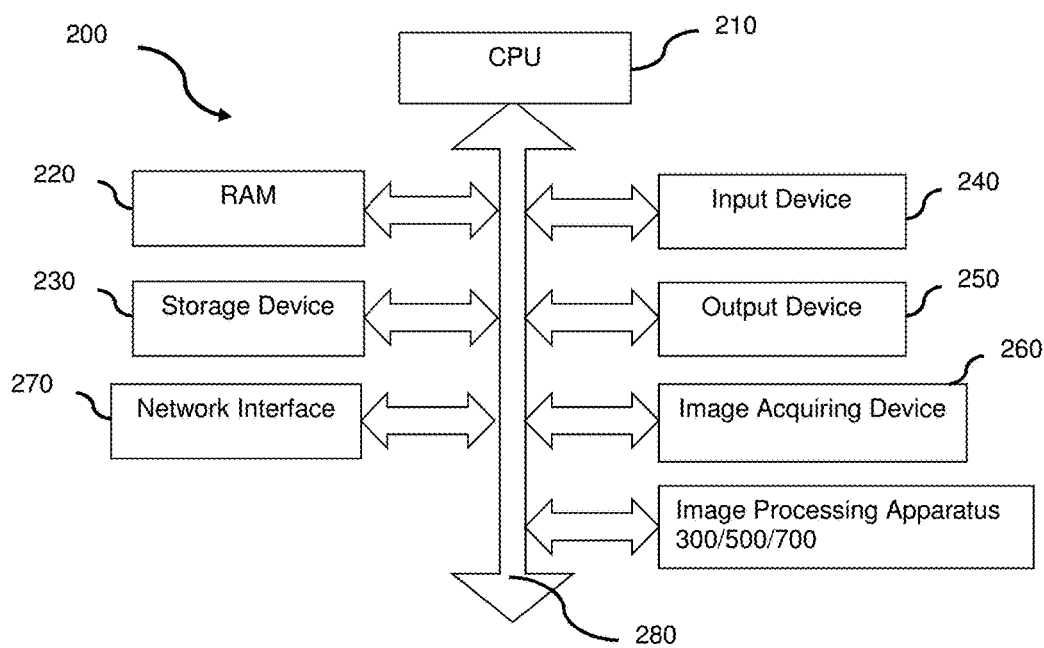
FIG. 2 is a block diagram schematically showing the hardware configuration that can implement the techniques according to the embodiments of the present invention.

The hardware configuration that can implement the techniques described hereinafter will be described first with reference to FIG. 2. FIG. 2 is a block diagram schematically showing the hardware configuration 200 that can implement the techniques according to the embodiments of the present invention. Wherein, in the present invention, the hardware configuration 200 is a camera (e.g. digital camera, video camera, network camera) for example. In first implementation, the image processing according to the present invention is configured by hardware or firmware and is acted as a module or component of the camera. For example, the image processing apparatus 300 which will be described in detail hereinafter by referring to FIG. 3 and/or the image processing apparatus 500 which will be described in detail hereinafter by referring to FIG. 5 and/or the image processing apparatus 700 which will be described in detail hereinafter by referring to FIG. 7 could be acted as a module or component of the camera. In second implementation, the image processing according to the present invention is configured by software and is stored in Storage Device 230 shown in FIG. 2 and is executed by Central Processing Unit (CPU) 210 shown in FIG. 2. For example, the image processing procedure 800/900 which will be described in detail hereinafter by referring to FIG. 8/FIG. 9 could be acted as a program stored in the Storage Device 230.

As for the above-mentioned first implementation, the hardware configuration 200, for example, includes CPU 210, Random Access Memory (RAM) 220, Storage Device 230, Input Device 240, Output Device 250, Image Acquiring Device 260, Network Interface 270, System Bus 280 and Image Processing Apparatus 300/500/700. As for the above-mentioned second implementation, the hardware configuration 200 will not include the above-mentioned Image Processing Apparatus 300/500/700 for example. And in this implementation, the programs corresponding to the image processing of the present invention which will be described later by referring to FIG. 8/FIG. 9 could be installed in the Storage Device 230 in advance and could be loaded from there to the RAM 220 when the CPU 210 needs to carry out the corresponding programs.

The CPU 210 is any suitable programmable control devices (such as processors) and executes a variety of functions, to be described hereinafter, by executing a variety of application programs that are stored in the Storage Device 230 (e.g. Read Only Memory (ROM) and/or Hard Disk). The RAM 220 is used to temporarily store the program or the data that is loaded from the Storage Device 230, and is also used as a space wherein the CPU 210 executes the variety of programs, such as carrying out the disclosed techniques which will be described in detail hereinafter by referring to FIG. 8 and FIG. 9, as well as other available functions. The Storage Device 230 stores many kinds of information, such as an operating system (OS), the various applications, a control program, images/videos acquired by the Image Acquiring Device 260 and data pre-stored or pre-generated by the manufacture, wherein the data could be thresholds (THs) which will be described hereinafter for example.

The Input Device 240 allows the user to interact with the hardware configuration 200. For example, the user could trigger the corresponding image processing of the present invention through the Input Device 240. And the Input Device 240 can take a variety of forms, such as a keypad or a touch screen. In addition, the Output Device 250 is an output interface and transfers the foreground objects except the false foreground objects to a monitoring device which will be described hereinafter with reference to FIG. 10 in case that the CPU 210 or the Image Processing Apparatus 300/500/700 identifies the false foreground objects in the current image/frame.

The Image Acquiring Device 260 is used to acquire images/videos of a monitoring place for example and the Image Acquiring Device 260 can be acted as an optical system of the camera.

The Image Processing Apparatus 300/500/700 is used to identify whether the foreground objects in the current image/frame are the false foreground objects or not. The Network Interface 270 provides an interface for connecting the hardware configuration 200 to a network (such as the network 1030 shown in FIG. 10). For example, the hardware configuration 200 performs, via the Network Interface 270, data communication with other electronic device (such as the Monitoring Device 1020 shown in FIG. 10) connected via the network. Alternatively, a wireless interface could be provided for the hardware configuration 200 to perform wireless data communication. The system bus 280 provides a data transfer path for transferring data to, from, or between the CPU 210, the RAM 220, the Storage Device 230, the Input Device 240, the Output Device 250, the Image Acquiring Device 260, the Network Interface 270 and the Image Processing Apparatus 300/500/700, and the like to each other. Although referred to as a bus, the system bus 280 is not limited to any specific data transfer technology.

The above described hardware configuration 200 is merely illustrative and is in no way intended to limit the invention, its application, or uses. And for the sake of simplicity, only one hardware configuration is shown in FIG. 2. However, a plurality of hardware configurations can also be used as needed.

(Configuration of the Image Processing Apparatus)

The configuration for image processing of the present invention will be described next with reference to FIG. 3 to FIG. 9.

Figure 3:
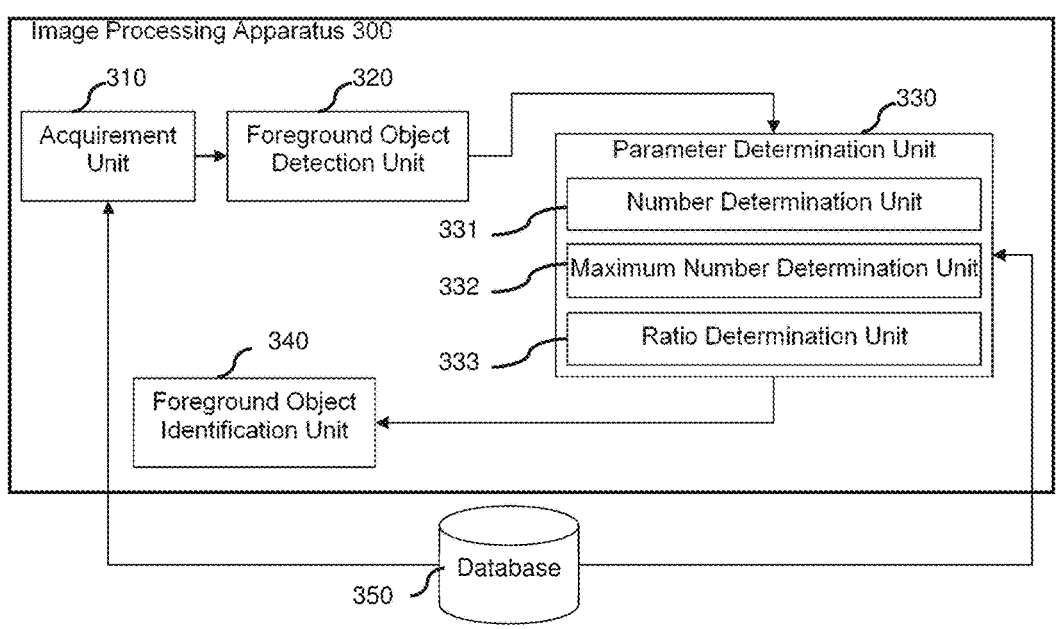
FIG. 3 is a block diagram illustrating the configuration of the image processing apparatus according to the first embodiment of the present invention.

FIG. 3 is a block diagram illustrating the configuration of the image processing apparatus 300 shown in FIG. 2 according to the first embodiment of the present invention. Some or all of the blocks shown in FIG. 3 are implemented by dedicated hardware.

As shown in FIG. 3, the image processing apparatus 300 according to the embodiment of the present invention comprises: an acquirement unit 310, a foreground object detection unit 320, a parameter determination unit 330 and a foreground object identification unit 340. In addition, a database 350 shown in FIG. 3 stores images/videos acquired by the Image Acquiring Device 260 shown in FIG. 2. And the database 350 also stores the pre-defined thresholds, such as TH1 and TH2 which will be described hereinafter. In one implementation, the database 350 is the Storage Device 230 shown in FIG. 2.

First, the Image Acquiring Device 260 would acquire a plurality of images/videos and would store the acquired images/videos into the Storage Device 230 (e.g. the database 350). As described above, a video could be regarded as a sequence of images, thus the procedure for processing the videos is similar with the procedure for processing the images. Therefore, in order to make the description briefly, we will use the images as the processing objects hereinafter.

And then, as for a current image acquired by the Image Acquiring Device 260, the acquirement unit 310 would acquire the current image from the Image Acquiring Device 260 via the System Bus 280. And the acquirement unit 310 also would acquire a background image from the database 350 via the System Bus 280, wherein the background image is obtained according to images acquired by the Image Acquiring Device 260 in a predefined duration time previous to the current image. As described above, the acquirement unit 310 would adaptively acquire the background image based on the images stored in the database 350 which are acquired in a certain duration time previous to the current image, wherein the certain duration time is not limited and is set based on experimental statistics and/or experience. In this embodiment, the acquirement unit 310 uses the average image of a plurality of images acquired in the certain duration time previous to the current image as the background image.

The foreground object detection unit 320 would detect foreground objects from the current image according to the background image. As described above, by comparing the current image with the background image, the moving objects or the new appeared objects in the current image will be regarded as the foreground objects. Furthermore, the foreground object detection unit 320 could detect the foreground objects from the current image via the existing background subtraction algorithm or the existing image frame difference algorithm for example. For example, in this embodiment, the foreground object detection unit 320 detects the foreground objects from the current image via the background subtraction algorithm disclosed in the Patent U.S. Pat. No. 8,305,440.

After the foreground object detection unit 320 detects the foreground objects, in order to identify whether there are the false foreground objects among the foreground objects, wherein the false foreground objects are the shadows or highlights caused by the environmental illumination changes (such as the false foreground objects caused by the light sources' on/off) for example; as for each of the foreground objects, the parameter determination unit 330 would determine the above-mentioned luminance change ratio (i.e. the first parameter) according to luminance information of the foreground object in the current image and luminance information of portion corresponding to the foreground object in the background image; wherein the luminance change ratio represents change degree of luminance direction of the portion corresponding to the foreground object from the background image to the current image.

Furthermore, the parameter determination unit 330 determines the luminance change ratio according to luminance values of visual elements of the foreground object in the current image and luminance values of visual elements of the portion corresponding to the foreground object in the background image. As described above, the visual elements are visible characteristics contributing to the appearance of the current image and the background image; wherein one visual element for example could be a pixel, a DCT block or a super-pixel. In one implementation, in order to simply and quickly determine the change of the luminance direction (i.e. becoming brightness or becoming darkness) of the portion corresponding to the foreground object from the background image to the current image, and in order to simply and quickly determine the change degree of the luminance direction, as shown in FIG. 3, the parameter determination unit 330 comprises a number determination unit 331, a maximum number determination unit 332 and a ratio determination unit 333.

First, the number determination unit 331 determines first number of the visual elements of the portion corresponding to the foreground object whose luminance values in the current image are larger than the corresponding luminance values in the background image and determines second number of the visual elements of the portion corresponding to the foreground object whose luminance values in the current image are less than the corresponding luminance values in the background image.

More specifically, taking the first number for example, in case one visual element corresponds to one pixel, the first number is the sum of the pixels in the portion corresponding to the foreground object, wherein the pixels are the pixels whose luminance values in the current image are larger than the corresponding luminance values in the background image. That is to say, First Number=Σ Number Number of pixels, wherein the pixels in this formula are the pixels whose luminance values in the current image are larger than the background image.

In case one visual element corresponds to one DCT block, wherein each DCT block comprises the same number of pixels, the first number is the sum of the pixels comprised by the corresponding DCT blocks in the portion corresponding to the foreground object, wherein the corresponding DCT blocks are the DCT blocks whose luminance values in the current image are larger than the corresponding luminance values in the background image. That is to say, First Number=(Number of pixels in one DCT block)×Σ Number of DCT blocks, wherein the DCT blocks in this formula are the DCT blocks whose luminance values in the current image are larger than the corresponding luminance values in the background image.

In case one visual element corresponds to one super-pixel, wherein each super-pixel comprises the same/different number of pixels, the first number is the sum of the pixels comprised by the corresponding super-pixels in the portion corresponding to the foreground object, wherein the corresponding super-pixels are the super-pixels whose luminance values in the current image are larger than the corresponding luminance values in the background image. That is to say, $$\text{First Number} = \sum_{T=1}^{N} \text{Number of pixels in } T \text{ super-pixel,}$$

wherein the T super-pixel in this formula is the super-pixel whose luminance values in the current image is larger than the corresponding luminance value in the background image.

And then, the maximum number determination unit 332 determines the larger number between the first number and the second number as maximum number, wherein the maximum number could reflect the change of the luminance direction of the portion corresponding to the foreground object from the background image to the current image.

Generally speaking, as for the environmental illumination changes caused by turning on the light sources, the luminance values of most part of the visual elements of the portion corresponding to the foreground object in the current image will be increased compared with the background image. That is to say, in this situation, the first number will be determined as the maximum number, and the change of the luminance direction is becoming brightness. And as for the environmental illumination changes caused by turning off the light sources, the luminance values of most part of the visual elements of the portion corresponding to the foreground object in the current image will be decreased compared with the background image. That is to say, in this situation, the second number will be determined as the maximum number, and the change of the luminance direction is becoming darkness. In addition, as for the environmental illumination changes caused by the real objects, the luminance values of some visual elements of the portion corresponding to the foreground object in the current image will be increased compared with the background image, and the luminance values of some visual elements of the portion corresponding to the foreground object in the current image will be decreased compared with the background image. That is to say, in this situation, sometimes the first number is larger than the second number, and sometimes the second number is larger than the first number.

And then, in order to determine the change degree of the luminance direction, the ratio determination unit 333 determines a ratio which is a quotient of the maximum number and the total number of the visual elements of the foreground object as the luminance change ratio. That is to say, $$LuminanceChangeRatio = \frac{MaximumNumber}{TotalNumber}.$$

Figure 4A:
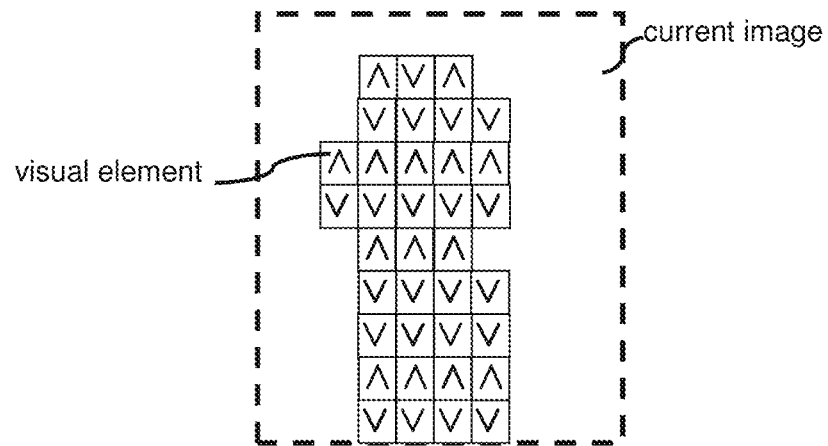
FIGS. 4A to 4C schematically show exemplary samples of a current image according to the present invention.

Taking an exemplary sample of the current image shown in FIG. 4A for example, the dashed line boundary represents the current image, and the blocks with the marks "∨" or "∧" represent the visual elements of the portion corresponding to the foreground object, wherein one visual element corresponds to one pixel in this example. The mark "∨" in one visual element represents that the luminance value of this visual element in the current image is decreased compared with the background image, and the mark "∧" in one visual element represents that the luminance value of this visual element in the current image is increased compared with the background image. Therefore, as shown in FIG. 4A, first, the number determination unit 331 would determine that the first number (i.e. the number of the visual elements with the mark "∧") is 14 and the second number (i.e. the number of the visual elements with the mark "∨") is 22. And then, the maximum number determination unit 332 would determine the second number as the maximum number. That is to say, the change of the luminance direction of the foreground object from the background image to the current image is becoming darkness. And finally, the ration determination unit 333 would determine the luminance change ratio as 0.61 via the formula $$LuminanceChangeRatio = \frac{22}{14+22} = 0.61.$$

Figure 4B:
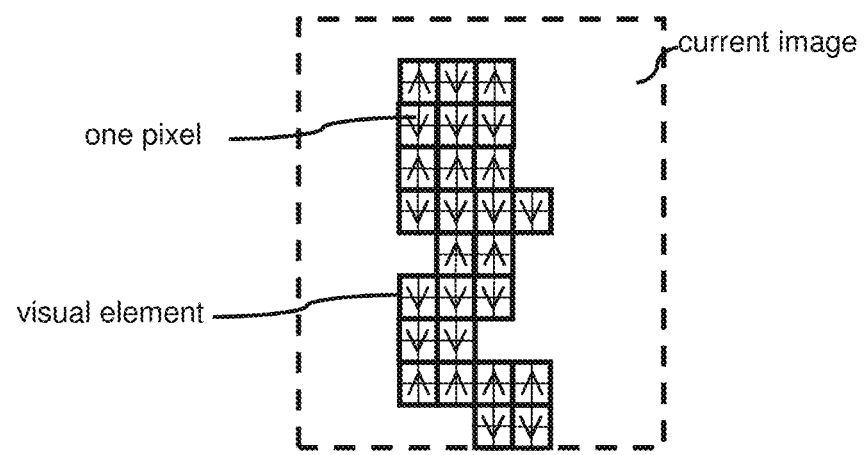

Taking another exemplary sample of the current image shown in FIG. 4B for example, the dashed line boundary represents the current image, and the blocks which have the thick edges and have the marks "∨" or "∧" represent the visual elements of the portion corresponding to the foreground object, wherein in this example, one visual element corresponds to one DCT block and one DCT block comprises four pixels. Therefore, as shown in FIG. 4B, first, the number determination unit 331 would determine that the first number (i.e. the sum of the number of pixels comprised by the visual elements with the mark "∧") is 11×4 and the second number (i.e. the sum of the number of pixels comprised by the visual elements with the mark "∨") is 15×4. And then, the maximum number determination unit 332 would determine the second number as the maximum number. That is to say, the change of the luminance direction of the foreground object from the background image to the current image is becoming darkness. And finally, the ration determination unit 333 would determine the luminance change ratio as 0.58 via the formula $$LuminanceChangeRatio = \frac{15 \times 4}{(11+15) \times 4} = 0.58.$$

Figure 4C:
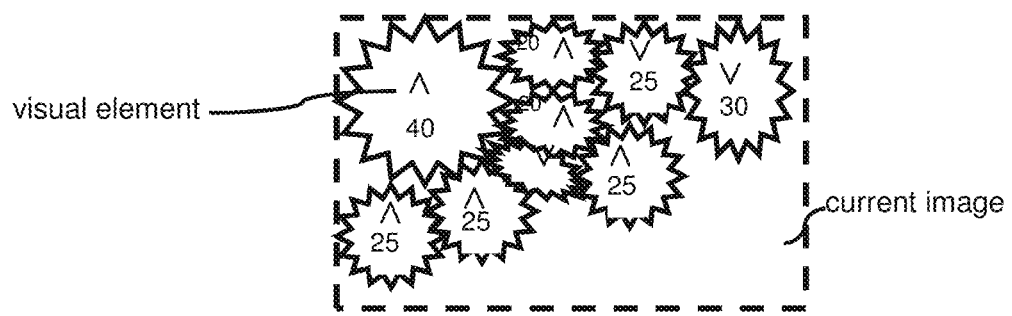

Taking the other exemplary sample of the current image shown in FIG. 4C for example, the dashed line boundary represents the current image, and the blocks which have the irregular shapes and have the marks "∨" or "∧" represent the visual elements of the portion corresponding to the foreground object, wherein one visual element corresponds to one super-pixel in this example. The data (such as "40") shown in one visual element represents the number of pixels that the corresponding visual element comprises. Therefore, as shown in FIG. 4C, first, the number determination unit 331 would determine that the first number (i.e. the sum of the number of pixels comprised by the visual elements with the mark "∧") is (40+25+25+20+20+25=155) and the second number (i.e. the sum of the number of pixels comprised by the visual elements with the mark "∨") is (10+25+30=65). And then, the maximum number determination unit 332 would determine the first number as the maximum number. That is to say, the change of the luminance direction of the foreground object from the background image to the current image is becoming lightness. And finally, the ration determination unit 333 would determine the luminance change ratio as 0.7 via the formula $$LuminanceChangeRatio = \frac{155}{155+65} = 0.7.$$

Now goes back to FIG. 3, after the parameter determination unit 330 determines the first parameter (i.e. the luminance change ratio), as for each of the foreground objects, the foreground object identification unit 340 would identify whether the foreground object is a false foreground object or not according to the first parameter. As described above, the luminance change ratio (i.e. the first parameter) is generally large in case the foreground object is caused by the light sources. Therefore, for example, a threshold (i.e. the above-mentioned TH1) could be predefined first by the manufacture based on experimental statistics, machine learning and/or experience and this threshold could be stored in the database 350 shown in FIG. 3. And then, the foreground object identification unit 340 would acquire TH1 from the database 350 via the System Bus 280 shown in FIG. 2 and would identify the foreground object as the false foreground object in case that the luminance change ratio is larger than or equal to TH1.

And finally, the foreground object identification unit 340 would transfer the foreground objects except the identified false foreground objects in the current image to the Output Device 250 shown in FIG. 2 via the system bus 280.

Figure 5:
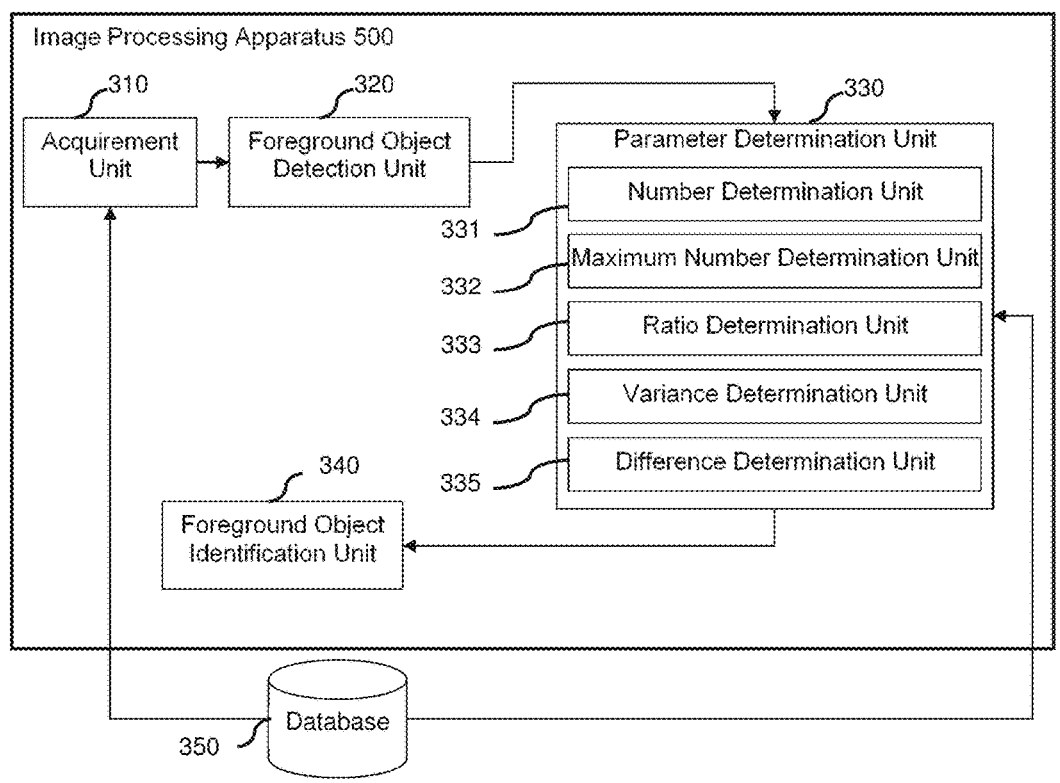
FIG. 5 is a block diagram illustrating the configuration of the image processing apparatus according to the second embodiment of the present invention.

As described above, in order to exclude the wrong identification in some situations, the above-mentioned luminance change ratio and the above-mentioned luminance variance difference could be used to identify the false foreground objects. FIG. 5 is a block diagram illustrating the configuration of the image processing apparatus 500 shown in FIG. 2 according to the second embodiment of the present invention. Some or all of the blocks shown in FIG. 5 are implemented by dedicated hardware.

Comparing FIG. 5 with FIG. 3, the main difference of the image processing apparatus 500 shown in FIG. 5 is that the parameter determination unit 330 in the image processing apparatus 500 would further determine the above-mentioned luminance variance difference (i.e. the second parameter) according to luminance information of the foreground object in the current image and luminance information of portion corresponding to the foreground object in the background image; wherein the luminance variance difference represents uniformity of surface pattern between the foreground object in the current image and the portion corresponding to the foreground object in the background image.

Furthermore, the parameter determination unit 330 determines the luminance variance difference according to variance of the luminance values of the visual elements of the foreground object in the current image and variance of the luminance values of the visual elements of the portion corresponding to the foreground object in the background image. In one implementation, in order to quickly determine whether or not the surface pattern of the foreground object in the current image and the portion corresponding to the foreground object in the background image is uniform, as shown in FIG. 5, the parameter determination unit 330 further comprises a variance determination unit 334 and a difference determination unit 335.

First, the variance determination unit 334 determines first mean variance of the luminance values of the visual elements of the portion corresponding to the foreground object in the current image and calculate second mean variance of the luminance values of the visual elements of the portion corresponding to the foreground object in the background image. In one instance, the first mean variance and the second mean variance could be calculated via the following formulas:

$$LuminanceVariance_i = \left(Luminance_i - \frac{\sum_{i=1}^{K} Luminance_i}{K}\right) * \left(Luminance_i - \frac{\sum_{i=1}^{K} Luminance_i}{K}\right)$$

$$MeanVariance = \frac{\sum_{i=1}^{K} LuminanceVariance_i}{K}$$

Wherein, "i" is the i-th visual element of the portion corresponding to the foreground object. "K" is the total number of the visual elements of the portion corresponding to the foreground object. "$Luminance_i$" is the luminance value of the i-th visual element.

$$"\frac{\sum_{i=1}^{K} Luminance_i}{K}"$$

is the mean luminance value of the total visual elements. "$LuminanceVariance_i$" is variance of the luminance value of the i-th visual element.

$$"\frac{\sum_{i=1}^{K} LuminanceVariance_i}{K}"$$

is the mean variance of the total visual elements.

And then, the difference determination unit 335 would determine a difference value between the first mean variance and the second mean variance as the luminance variance difference. In one instance, the absolute difference of the first mean variance and the second mean variance is determined as the luminance variance difference, that is to say, LuminanceVarianceDifference=|FirstMeanVariance−SecondMeanVariance|. In another instance, the quotient of the first mean variance and the second mean variance or the quotient of the second mean variance and the first mean variance is determined as the luminance variance difference, that is to say, $$LuminanceVarianceDifference = \frac{FirstMeanVariance}{SecondMeanVariance}$$

or $$LuminanceVarianceDifference = \frac{SecondMeanVariance}{FirstMeanVariance}.$$

In addition, as shown in FIG. 5, after the parameter determination unit 330 determines the two parameters (i.e. the luminance change ratio and the luminance variance difference), as for each of the foreground objects, the foreground object identification unit 340 would identify whether the foreground object is a false foreground object or not according to the these two parameters. As described above, the luminance change ratio (i.e. the first parameter) is generally large in case the foreground object is caused by the light sources and the luminance variance difference (i.e. the second parameter) is generally small in case the foreground object is caused by the light sources. Therefore, for example, two thresholds (i.e. the above-mentioned TH1 and TH2) could be predefined first by the manufacture based on experimental statistics, machine learning and/or experience and these two thresholds could be stored in the database 350 shown in FIG. 5. And then, the foreground object identification unit 340 would acquire the two thresholds from the database 350 via the System Bus 280 shown in FIG. 2 and would identify the foreground object as the false foreground object in case that the luminance change ratio is larger than or equal to TH1 and the luminance variance difference is less than TH2.

Figure 6:
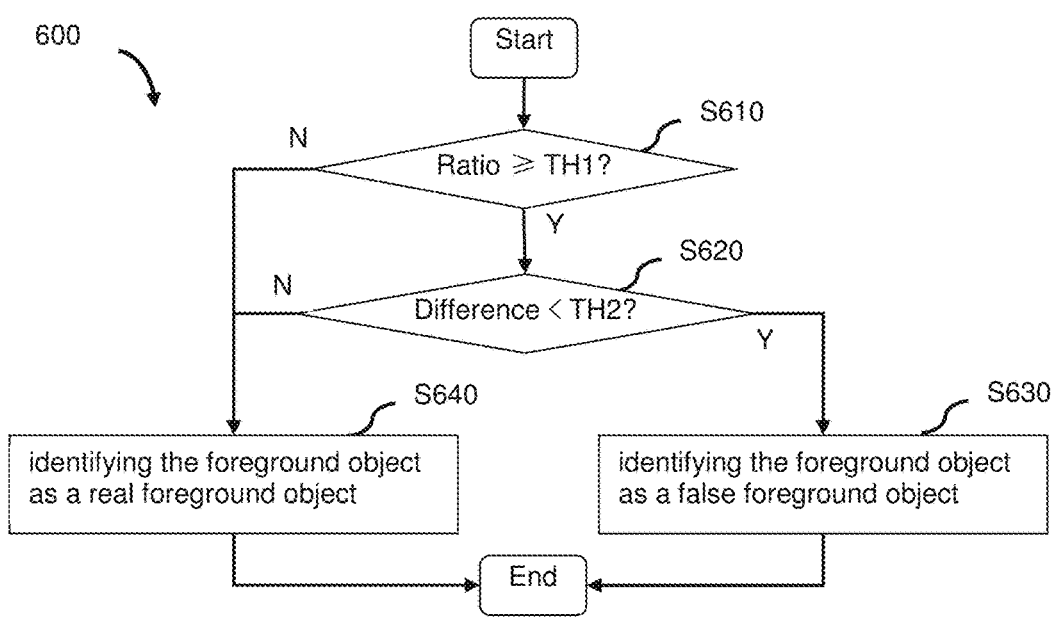
FIG. 6 is a flowchart schematically showing the detailed processing of the foreground object identification unit 340 shown in FIG. 5 of the present invention.

As for identifying whether or not one foreground object detected by the foreground object detection unit 320 shown in FIG. 5 is a false foreground object, one detailed processing of the foreground object identification unit 340 shown in FIG. 5 is shown in FIG. 6. FIG. 6 is a flowchart 600 schematically showing the detailed processing of the foreground object identification unit 340 of the present invention.

As shown in FIG. 6, first, in step S610, since the luminance change ratio is generally small in case the foreground object is a real object, the foreground object identification unit 340 would judge whether the luminance change ratio is larger than or equal to TH1 or not. In case the luminance change ratio is larger than or equal to TH1, the procedure will go to step S620. Otherwise, the foreground object identification unit 340 would judge that the luminance change ratio is relatively small and the procedure will go to step S640.

In step S620, since the luminance variance difference is generally small in case the foreground object is caused by the light sources, the foreground object identification unit 340 would judge whether the luminance variance difference is less than TH2 or not. In case the luminance variance difference is less than TH2, in step S630, the foreground object identification unit 340 would identify the foreground object is a false foreground object which is caused by the light sources' on/off for example. Otherwise, the procedure will go to step S640.

In step S640, the foreground object identification unit 340 would identify the foreground object is a real foreground object.

As for the processing shown in FIG. 6, the foreground object identification unit 340 first uses the luminance change ratio and then uses the luminance variance difference to identify whether the foreground object is a false foreground object or not. Alternatively, the foreground object identification unit 340 also could first use the luminance variance difference and then use the luminance change ratio. For example, the foreground object identification unit 340 would judge whether the luminance variance difference is less than TH2 or not. And then, in case the luminance variance difference is less than TH2, the foreground object identification unit 340 would judge whether the luminance change ratio is larger than or equal to TH1 or not. In case the luminance change ratio is larger than or equal to TH1, the foreground object identification unit 340 would identify the foreground object is a false foreground object.

In addition, since the acquirement unit 310 and the foreground object detection unit 320 shown in FIG. 5 are the same as the acquirement unit 310 and the foreground object detection unit 320 shown in FIG. 3, the detailed description would not be repeated herein.

Figure 7:
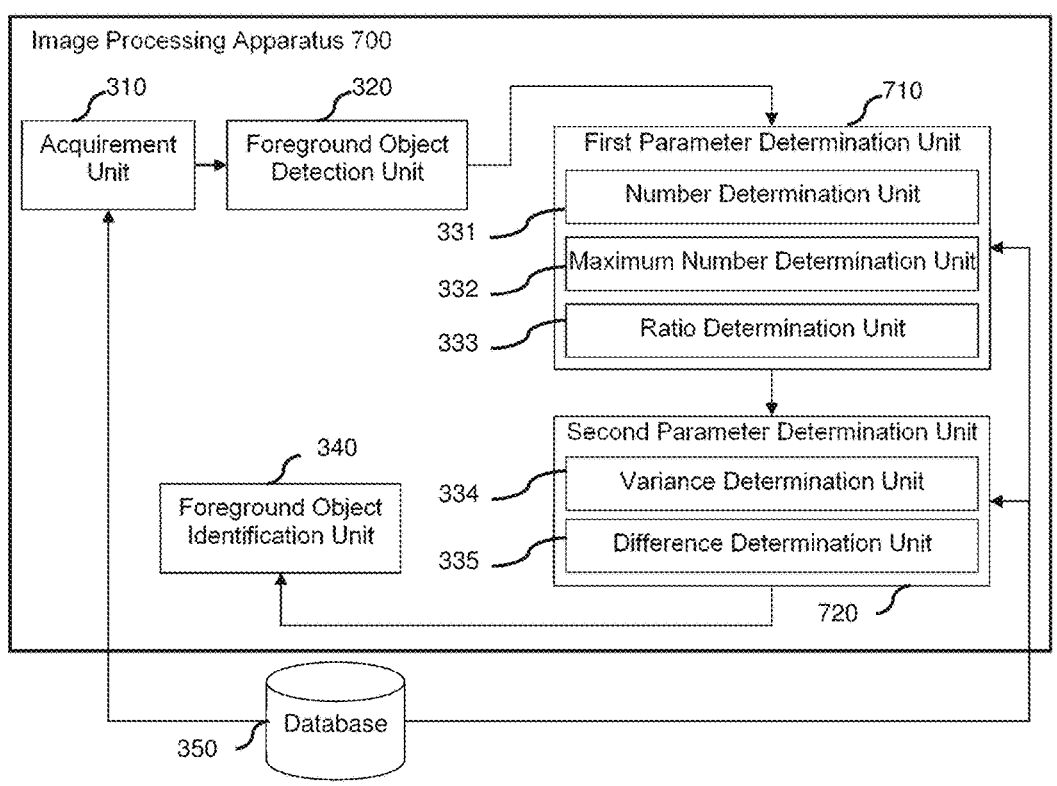
FIG. 7 is a block diagram illustrating the configuration of the image processing apparatus according to the third embodiment of the present invention.

As shown in FIG. 5, both of the above-mentioned two parameters (i.e. the luminance change ratio and the luminance variance difference) are determined by one same unit (i.e. the parameter determination unit 330). Alternatively, it will be understood by those skilled in the art that the above-mentioned two parameters could also be determined by two different units respectively. For example, FIG. 7 is a block diagram illustrating the configuration of the image processing apparatus 700 shown in FIG. 1 according to the third embodiment of the present invention. As shown in FIG. 7, the first parameter (i.e. the luminance change ratio) will be determined by the first parameter determination unit 710, and the second parameter (i.e. the luminance variance difference) will be determined by the second parameter determination unit 720. Wherein, the first parameter determination unit 710 could further comprise the number determination unit 331, the maximum number determination unit 332 and the ratio determination unit 333 which have been described in detail by referring to FIG. 3. And the second parameter determination unit 720 could further comprise the variance determination unit 334 and the difference determination unit 335 which have been described in detail by referring to FIG. 5. In addition, since the acquirement unit 310, the foreground object detection unit 320 and the foreground object identification unit 340 shown in FIG. 7 are the same as the acquirement unit 310, the foreground object detection unit 320 and the foreground object identification unit 340 shown in FIG. 5, the detailed description would not be repeated herein.

As described above, the luminance change ratio and the luminance variance difference are obtained from the current image and the background image directly, and these two parameters have the actual values instead of the approximated values, the identification accuracy of the present invention would be improved by using these accuracy parameters.

(Image Processing Procedure)

Figure 8:
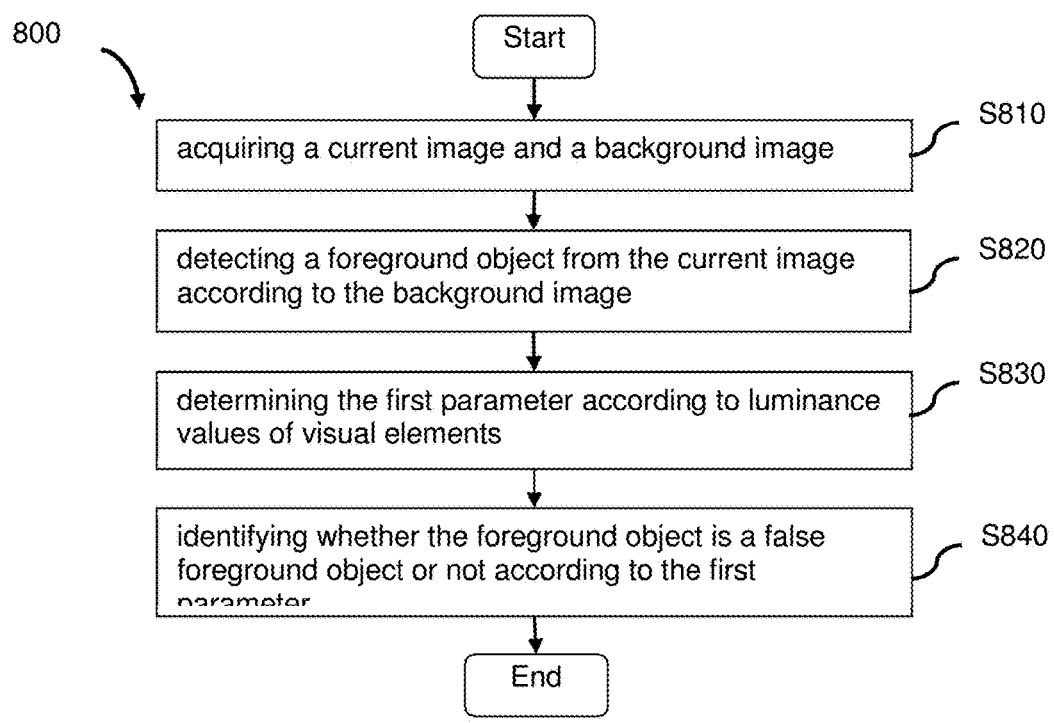
FIG. 8 is a flowchart schematically showing the procedure of overall image processing according to the first embodiment of the present invention.
Figure 9:
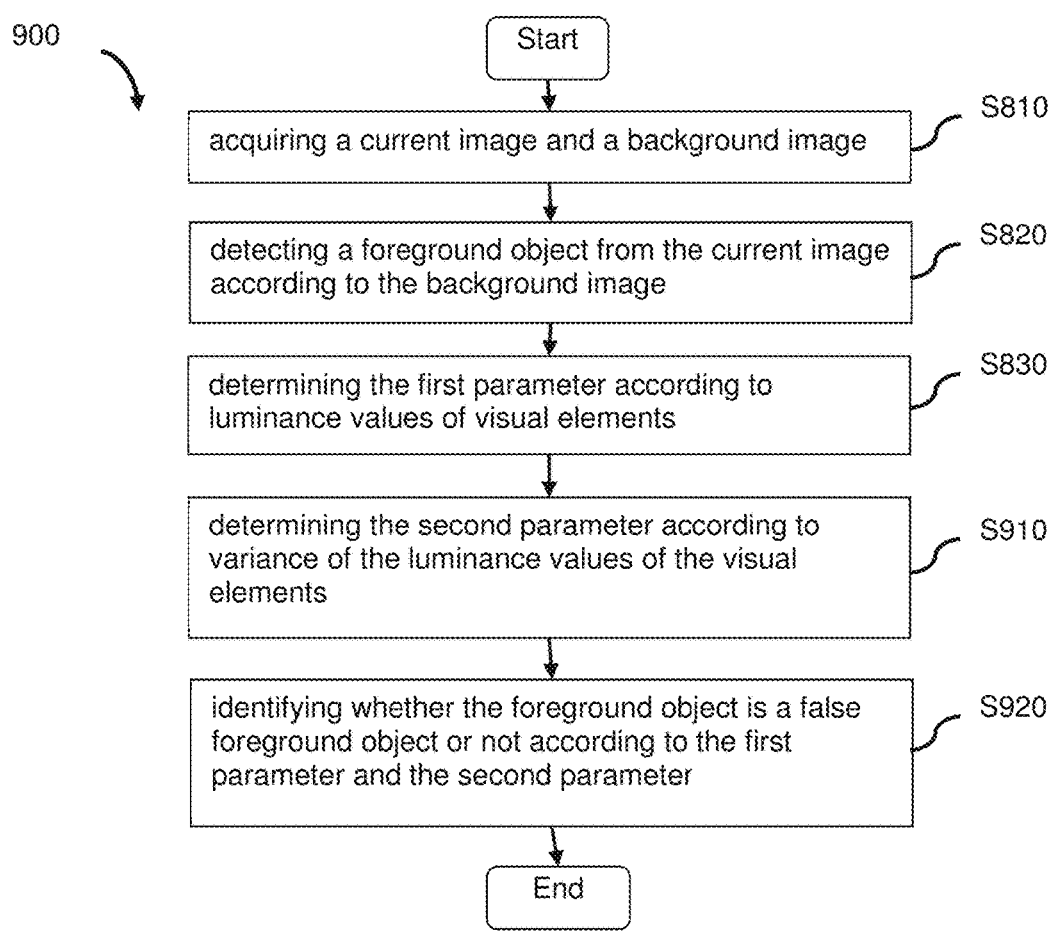
FIG. 9 is a flowchart schematically showing the procedure of overall image processing according to the second embodiment of the present invention.

As described above, the processing executed by the configuration of the embodiments shown in FIG. 3 and FIG. 5 and FIG. 7 also could be configured by software and could be executed by the CPU 210 shown in FIG. 2. The overall image processing will be described with reference to FIG. 8 and FIG. 9. FIG. 8 is a flowchart 800 schematically showing the procedure of overall image processing according to the first embodiment of the present invention. And FIG. 9 is a flowchart 900 schematically showing the procedure of overall image processing according to the second embodiment of the present invention.

As shown in FIG. 8, as described above, first, the Image Acquiring Device 260 shown in FIG. 2 would acquire a plurality of images/videos and would store the acquired images/videos into the Storage Device 230. As described above, a video could be regarded as a sequence of images, thus the procedure for processing the videos is similar with the procedure for processing the images. Therefore, in order to make the description briefly, we will use the images as the processing objects hereinafter.

And then, as for a current image acquired by the Image Acquiring Device 260, in acquirement step S810, the CPU 210 would acquire the current image from the Image Acquiring Device 260 via the System Bus 280. And the CPU 210 also would acquire a background image from the Storage Device 230 via the System Bus 280, wherein the background image is obtained according to images acquired by the Image Acquiring Device 260 in a predefined duration time previous to the current image. In this embodiment, the CPU 210 uses the average image of a plurality of images acquired in the certain duration time previous to the current image as the background image.

In foreground object detection step S820, the CPU 210 would detect foreground objects from the current image according to the background image. For example, in this embodiment, the CPU 210 detects the foreground objects from the current image via the background subtraction algorithm disclosed in the U.S. Pat. No. 8,305,440.

After the CPU 210 detects the foreground objects, in order to identify whether there are the false foreground objects among the foreground objects, as for each of the foreground objects, in parameter determination step S830, the CPU 210 would determine a first parameter (i.e. the luminance change ratio) according to luminance values of visual elements of the foreground object in the current image and luminance values of visual elements of the portion corresponding to the foreground object in the background image. Wherein, the first parameter represents change degree of luminance direction of the portion corresponding to the foreground object from the background image to the current image, and the detailed processing of this step could refer to the above-mentioned implementation of the parameter determination unit 330 shown in FIG. 3.

After the CPU 210 determines the first parameter, as for each of the foreground objects, in the foreground object identification step S840, the CPU 210 would identify whether the foreground object is a false foreground object or not according to the first parameter. More specifically, the CPU 210 would acquire the threshold (i.e. TH1) from the Storage Device 230 via the System Bus 280 shown in FIG. 2 and would identify the foreground object as the false foreground object in case that the first parameter is larger than or equal to TH1.

And finally, the CPU 210 would transfer the foreground objects except the identified false foreground objects in the current image to the Output Device 250 shown in FIG. 2 via the system bus 280.

Comparing FIG. 9 with FIG. 8, the main difference is that the procedure shown in FIG. 9 further comprising step S910.

As shown in FIG. 9, after the CPU 210 determines the first parameter, in the step S910, the CPU 210 would determine a second parameter (i.e. the luminance variance difference) according to variance of the luminance values of the visual elements of the foreground object in the current image and variance of the luminance values of the visual elements of the portion corresponding to the foreground object in the background image. Wherein, the second parameter represents uniformity difference of surface pattern between the foreground object in the current image and the portion corresponding to the foreground object in the background image, and the detailed processing of this step could refer to the above-mentioned implementation of the parameter determination unit 330 shown in FIG. 5.

After the CPU 210 determines the two parameters (i.e. the luminance change ratio and the luminance variance difference), as for each of the foreground objects, in the foreground object identification step S920, the CPU 210 would identify whether the foreground object is a false foreground object or not according to these two parameters. Wherein, the detailed processing of this step could refer to the above-mentioned flowchart 600 shown in FIG. 6.

(A Monitoring System)

Figure 10:
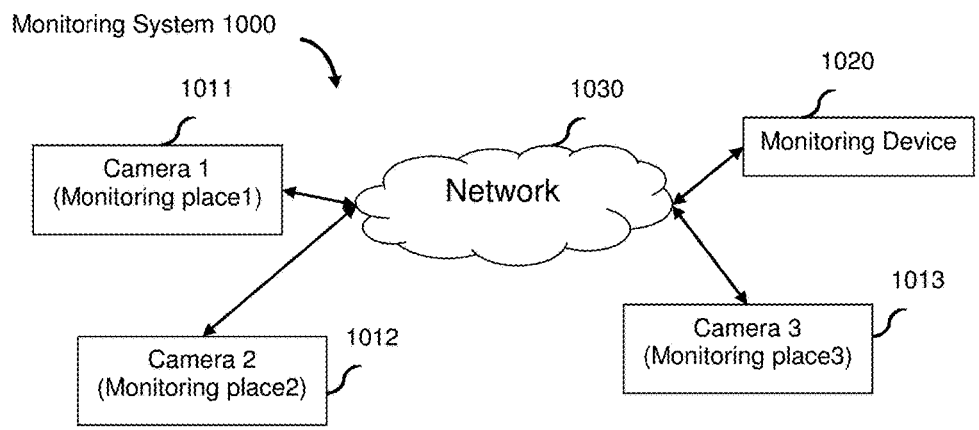
FIG. 10 illustrates the arrangement of an exemplary monitoring system according to the present invention.

As described above, in case that the CPU 210 or the Image Processing Apparatus 300/500/700 shown in FIG. 2 identifies the false foreground objects in the current image/frame, the Output Device 250 shown in FIG. 2 will transfer the foreground objects except the false foreground objects to a monitoring device. That is to say, in case that the hardware configuration 200 (i.e. the camera) shown in FIG. 2 identifies the false foreground objects in the current image/frame, the camera will transfer the foreground objects except the false foreground objects to a monitoring device. Therefore, as an exemplary application of the above-mentioned image processing, an exemplary monitoring system will be described next with reference to FIG. 10. FIG. 10 illustrates the arrangement of an exemplary monitoring system 1000 according to the present invention.

As shown in FIG. 10, the monitoring system 1000 according to the present invention comprises Camera 1011 used to monitor the monitoring place 1, Camera 1012 used to monitor the monitoring place 2, Camera 1013 used to monitor the monitoring place 3 and Monitoring Device 1020. Wherein, the Cameras 1011-1013 and the Monitoring Device 1020 are connected with each other via network 1030. And the network 1030 may provide a data transfer path for transferring data to, from, or between the Cameras 1011-1013, the Monitoring Device 1020 and the like to each other. In addition, a system bus (not shown) could be used to replace the network 1030. In this monitoring system 1000, for example, the Camera 1011 and the Camera 1012 have the same hardware configuration 200 shown in FIG. 2 according to the present invention, and the Camera 1013 is a camera with a function disclosed in the above-mentioned patent application US2014/0003720. As shown in FIG. 10, the procedure between the Camera 1011 and the Monitoring Device 1020 would be described in detail hereinafter. Wherein, the procedure between the Camera 1012/1013 and the Monitoring Device 1020 is similar with the Camera 1011.

As described above, first, the Camera 1011 (e.g. the Image Acquiring Device 260 shown in FIG. 2) would continuously capture images/videos of the monitoring place 1 and would store the captured images/videos in its Storage Device (e.g. the Storage Device 230 shown in FIG. 2).

Second, the Camera 1011 (e.g. the Image Processing Apparatus 300/500/700 shown in FIG. 2) would identify whether the foreground objects detected from the current image/frame are false foreground objects or not according to the above-mentioned description with reference of FIGS. 3~9.

Third, in case the Camera 1011 identifies that several foreground objects are the false foreground objects, the Camera 1011 will transfer the foreground objects except the identified false foreground objects to the Monitoring Device 1020 via the network 1030. And finally, the Monitoring Device 1020 would determine whether or not to provide an alarm (e.g. playing the alarmed sound) based on the received foreground objects and the pre-defined alarming rules. And then, in case the Monitoring Device 1020 provides the alarm, the user/monitoring person would execute the corresponding subsequence processing according to the alarm.

Figure 11:
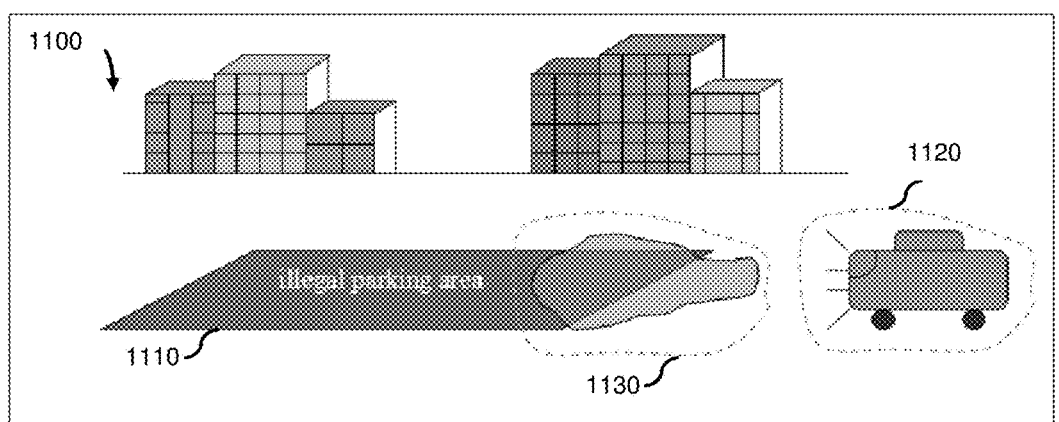
FIG. 11 schematically shows an exemplary current image of an illegal parking area.

Taking a monitoring processing of an illegal parking area (as shown in FIG. 11) for example, wherein the images/videos of the illegal parking area are continuously captured by the Camera 1011, and the pre-defined alarming rule is that providing an alarm in case that cars or other objects are parked in the illegal parking area 1110. FIG. 11 schematically shows an exemplary current image 1100 of the illegal parking area 1110 captured by the Camera 1011, wherein, 1120 represents a car and 1130 represents a shadow occurred by an airplane in the sky. According to the present invention, the car 1120 and the shadow 1130 would be detected as the foreground object from the current image of the illegal parking area 1110. Furthermore, based on the above-mentioned two parameters (i.e. the luminance change ration and the luminance variance difference), the shadow 1130 would be identified as the false foreground object. Therefore, the Camera 1011 will transfer the foreground object (i.e. the car 1120) to the Monitoring Device 1020 via the network 1030, and the Monitoring Device 1020 would not provide an alarm to the monitoring person since there are no objects parked in the illegal parking area 1110.

As described above, the accuracy of identifying the false foreground objects could be improved by using the present invention, therefore, the monitoring accuracy of the monitoring system 1000 also could be improved by using the present invention.

All of the units described above are exemplary and/or preferable modules for implementing the processes described in the present disclosure. These units can be hardware units (such as a Field Programmable Gate Array (FPGA), a digital signal processor, an application specific integrated circuit or the like) and/or software modules (such as computer readable program). The units for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. An image processing apparatus, comprising:
a processor; and
memory communicatively coupled to the processor, for storing computer-executable instructions that, when executed by the processor, perform operations of:
an acquirement unit configured to acquire a current image and a background image, wherein the background image is obtained according to images acquired in a predefined duration time previous to the current image;
a foreground object detection unit configured to detect a foreground object from the current image according to the background image;
a parameter determination unit configured to determine a first parameter and a second parameter, according to luminance information of the foreground object in the current image and luminance information of a portion corresponding to the detected foreground object in the background image,
wherein the first parameter represents a ratio of a number of visual elements, which have a dominant luminance direction changed from the background image to the detected foreground object of the current image, to a number of foreground visual elements in the portion corresponding to the detected foreground object, and the second parameter represents a difference value between variance of the luminance values of the foreground visual elements of the detected foreground object in the current image and variance of the luminance values of corresponding visual elements of the portion corresponding to the detected foreground object in the background image; and
a foreground object identification unit configured to determine that the foreground object is a false foreground object if the ratio as the first parameter is larger than a first predefined threshold and the difference as the second parameter is less than a second predefined threshold.

2. The image processing apparatus according to claim 1, wherein the parameter determination unit further comprises:
a variance determination unit configured to determine first mean variance of the luminance values of the visual elements in the current image and calculate second mean variance of the luminance values of the visual elements in the background image; and
a difference determination unit configured to determine the difference value between the first mean variance and the second mean variance as the second parameter.

3. The image processing apparatus according to claim 1, wherein the foreground object identification unit determines that the foreground object is a false foreground object in a case where the first parameter is larger than or equal to a first predefined threshold.

4. A camera, comprising:
an image acquiring device configured to acquire images or videos;
a storage device configured to store the acquired images or videos; and
the image processing apparatus according to claim 1, configured to determine whether the foreground objects detected from the current image or frame are false foreground objects or not.

5. An image processing method, comprising:
an acquirement step of acquiring a current image and a background image; wherein the background image is obtained according to images acquired in a predefined duration time previous to the current image,
a foreground object detection step of detecting a foreground object from the current image according to the background image;
a parameter determination step of determining a first parameter and a second parameter, according to luminance information of the foreground object in the current image and luminance information of a portion corresponding to the detected foreground object in the background image,
wherein the first parameter represents a ratio of a number of visual elements, which have a dominant luminance direction changed from the background image to the detected foreground object of the current image, to a number of foreground visual elements in the portion corresponding to the detected foreground object, and the second parameter represents a difference value between variance of the luminance values of the foreground visual elements of the detected foreground object in the current image and variance of the luminance values of corresponding visual elements of the portion corresponding to the detected foreground object in the background image; and
a foreground object identification step of determining that the foreground object is a false foreground object if the ratio as the first parameter is larger than a first predefined threshold and the difference as the second parameter is less than a second predefined threshold.

6. The image processing method according to claim 5, wherein the parameter determination step further comprises:

a variance determination step of determining first mean variance of the luminance values of the visual elements in the current image and calculate second mean variance of the luminance values of the visual elements in the background image; and a difference determination step of determining the difference value between the first mean variance and the second mean variance as the second parameter.

7. The image processing method according to claim 5, wherein, in the foreground object identification step, the foreground object is determined to be a false foreground object in a case where the first parameter is larger than or equal to a first predefined threshold.

\* \* \* \* \*